INVENTORS
ROBERT F. BAKER
BY EBON PAUL WEAVER

Robert J. Patterson
ATTORNEY

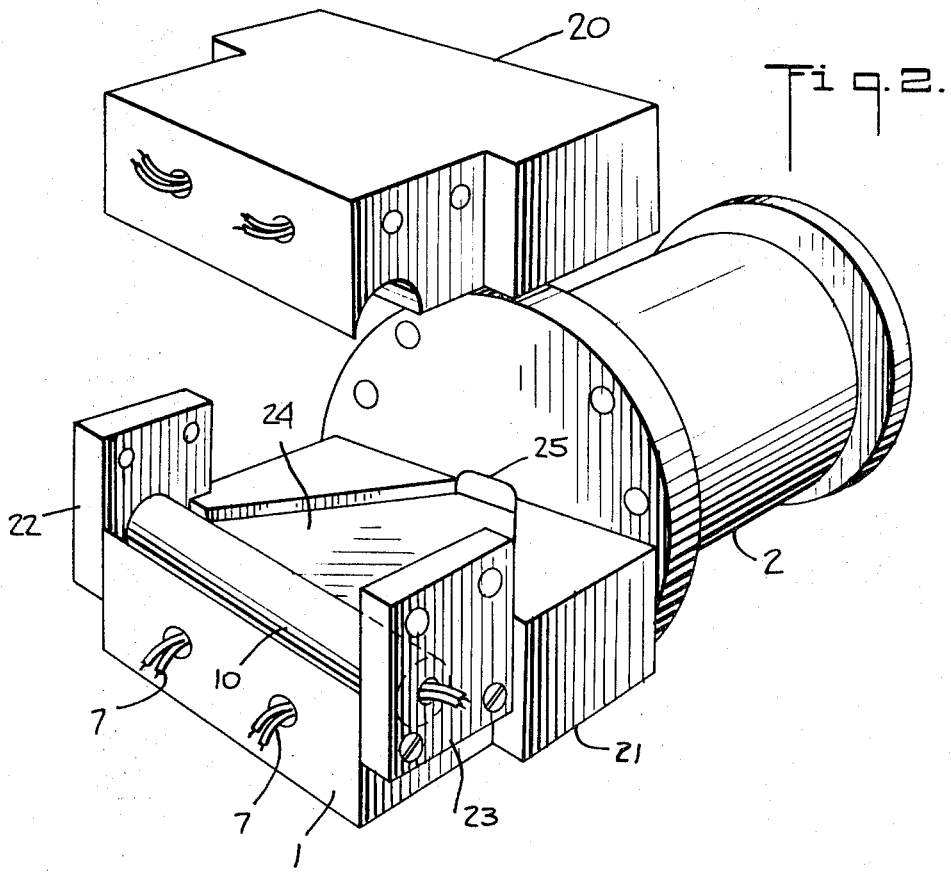
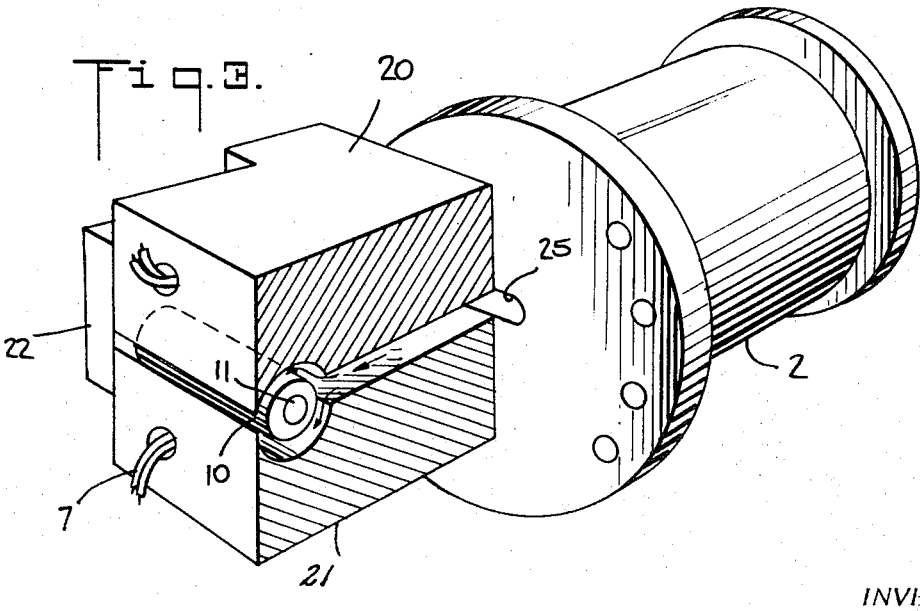

United States Patent Office 3,608,145
Patented Sept. 28, 1971

3,608,145
APPARATUS FOR MAKING A PLASTIC EXTRUDATE HAVING UNBLOWN OUTER PORTION AND INTEGRAL BLOWN PORTION
Robert F. Baker and Ebon P. Weaver, Naugatuck, Conn., assignors to Uniroyal, Inc., New York, N.Y.
Filed July 15, 1969, Ser. No. 841,900
Int. Cl. B29d 27/04
U.S. Cl. 18—12F                                        6 Claims

ABSTRACT OF THE DISCLOSURE

A die and method for plastic extrusion are disclosed herein in which a heater element within the die is maintained at a temperature above the decomposition temperature of a blowing agent incorporated in a plastic melt to be extruded, and the body and exit orifice of the die are maintained at a temperature below the decomposition temperature of the blowing agent.

---

This invention relates to the extrusion of plastic sheets, pipes, rods and other related articles.

The invention more specifically deals with the production of such articles having cellular cores and smooth surfaces.

BACKGROUND OF THE INVENTION

The process extruding cellular thermoplastic conventionally utilizes a gas thoroughly mixed or incorporated in a plastic melt. The gas may be incorporated directly into the melt or may be derived from a volatile liquid similarly admixed. A blowing agent may also be included on or in the plastic prior to processing. A blowing agent is defined as a substance or substances which will decompose or react under the influence of temperature in such a manner as to form a gas. A plastic melt in which the blowing agent has decomposed is known as a blown plastic melt.

The conventional extrusion operation usually involves the use of an extruder in which the plastic melt is propelled into an extrusion die which is attached thereto. The extrusion die has an exit orifice from which the plastic melt is extruded in the form of pipes, sheets or other shapes as desired.

In prior art apparatus, the plastic melt is blown within the extruder or within the extrusion die by adding and mixing gas or volatile liquid or causing a blowing agent to decompose. The thermoplastic thus formed has a rough surface due to the complete decomposition or other change of the blowing agent throughout the mass and the resulting dispersion of gas throughout. This rough surface is in many cases undesirable. Although prior art methods are available to produce a smooth surface on cellular thermoplastic material, they usually involve treatment of the cellular thermoplastic melt after it exits the extrusion due, requiring additional space and equipment and therefore greater expense.

It is therefore an object of this invention to provide novel apparatus and methods for producing cellular thermoplastic material having smooth surfaces.

It is a further object of this invention to produce directly from the extrusion die a cellular thermoplastic having smooth surfaces.

It is another object of this invention to provide a relatively simple and inexpensive yet thoroughly effective extrusion die for producing cellular thermoplastics having smooth surfaces.

It is another object of this invention to provide a novel process consisting of a minimum number of steps for producing cellular thermoplastic material having smooth surfaces.

Still further objects and the entire scope of applicability of the invention will become apparent from the detailed description given hereinafter; it should be understood, however, that the detailed description and specific embodiment shown are given by way of illustration only, since various changes and modifications within the spirit and scope of the invention will become apparent to those skilled in the art from this detailed description and the following drawings.

SUMMARY OF THE INVENTION

The present inventors have now found that, by control of the various internal temperatures of the thermoplastic melt within the extrusion die and by careful design of the die itself, a thermoplastic can be extruded directly from the die having a desired smooth surface and cellular core.

According to the invention an unblown plastic melt incorporating a blowing agent is fed into an extrusion die in which a heater element resides. The heater element is maintained at a temperature above the decomposition temperature of the blowing agent. Thus, the plastic melt near the heater will become cellular or gas expanded as a result of the decomposition of the blowing agent. The die body on the other hand is maintained at a temperature below the decomposition temperature of the blowing agent. Thus the blowing agent in the plastic melt away from the heater element will not be permitted to decompose and such plastic melt will remain non-cellular or unblown. As the heater element is located within the flow of plastic melt the core or inside of the extrudate produced from the die will be cellular or blown. The external surface of the extrudate will consist of the plastic melt which was not in proximity to the heater, and will be unblown, and thus give the extrudate the desired smooth non-cellular surface.

DRAWINGS

FIG. 2 is a perspective view of the assembled extrusion apparatus with the upper forward half of the die elevated.

FIG. 3 is a similar perspective view showing the extrusion die with its forward side half broken away.

DETAILED DESCRIPTION

Figure 1:
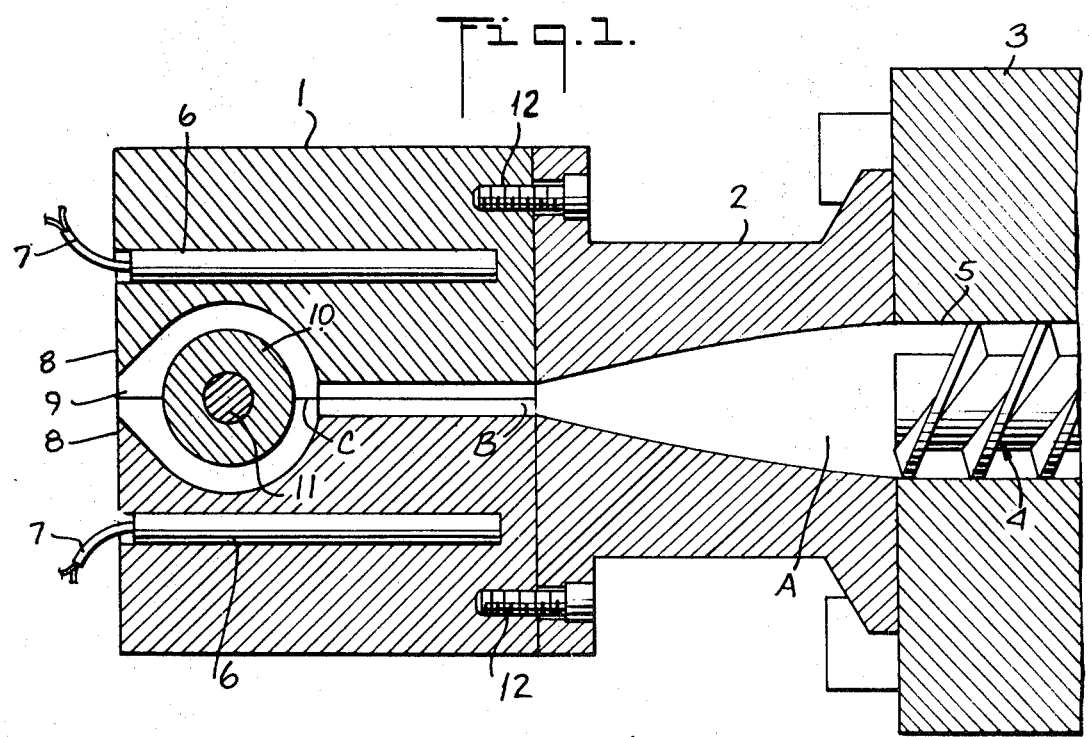
FIG. 1 is a sectional view of the assembled apparatus according to the invention.

Referring specifically to FIG. 1, an extrusion die 1 is shown attached to an extruder 3 by means of an adapter member 2. Worm screw means 4 is used to forward the melt through extruder duct 5. The velocity of the melt through the apparatus may be controlled by the speed of revolution of the worm screw means 4. The temperature of the die is controlled by means of cartridge type heaters 6, electrically controllable by means of conductors 7 connected to external electrical sources. It is apparent that other heating means may be utilized; as for example heat transfer fluids.

The plastic melt enters the adapter member 2 at A. At B the melt enters the die 1, where it passes into a cavity C containing a transversely disposed cylinder 10 with a heater element 11 contained therein. The plastic melt finally is extruded at exit orifice 9. Lips 8 at the exit orifice control the form and volume of the extrudate. The lips are preferably formed with sharp terminal edges, as shown, to prevent excessive drag at the point of exit. The temperature of cylinder 10 is maintained above the decomposition temperature of the blowing agent incorporated in the plastic melt. The die body 1 and its lips 8 are maintained at a temperature below this decomposition temperature.

The die 1 may be fastened to the adapter member 2 by conventional means, for example, bolts 12.

FIG. 2 shows the die 1 with its upper and lower halves 20 and 21 separated. Opening 25 of adapter member 2 passes the melt into duct 24 and on around the cylinder 10. Die end plates 22 and 23 may also contain heater elements if desired.

In FIG. 3, the flow of plastic melt is shown by directional arrows from opening 25 around heated cylinder 10. Upper and lower halves 20, 21 of the die are shown sectionalized.

Figure 4:
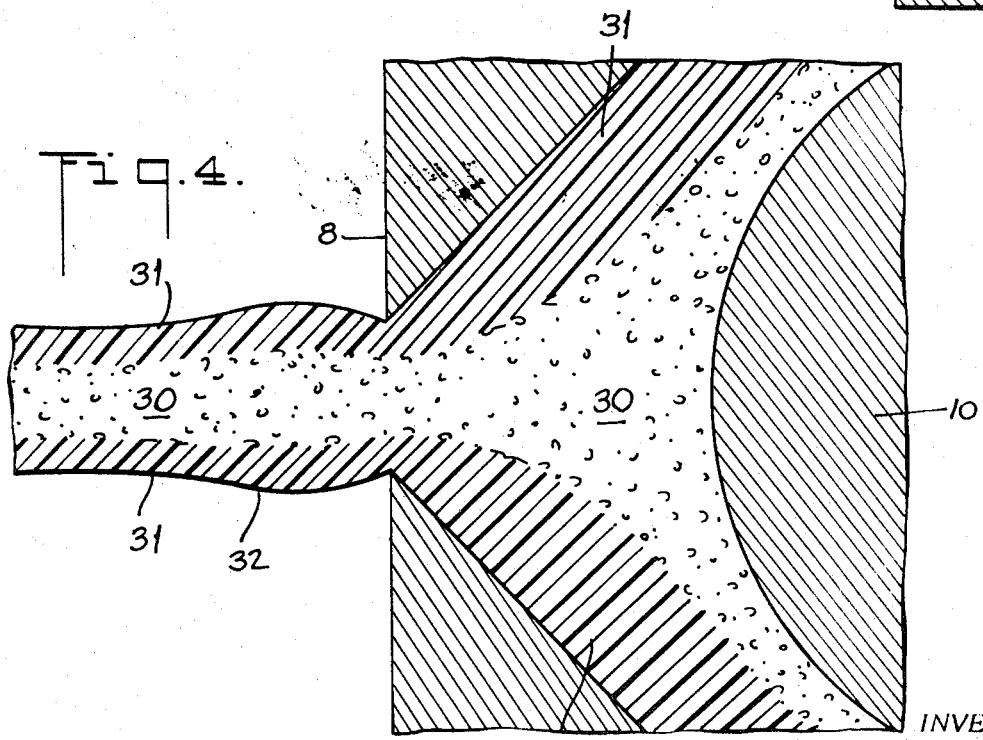
FIG. 4 is a fragmentary sectional view of the area around the extrusion die exit orifice including a representation of the plastic melt.

FIG. 4 shows graphically what occurs as the melt is extruded. Cylinder 10 is maintained above the decomposition temperature of the incorporated blowing agent. As a result, the blowing agent in the melt flowing around the cylinder is caused to decompose and form tiny gas-pockets within the melt. The area of blown melt is shown as 30. On the other hand, the melt passing near the body and lips 8 of the die is maintained at a temperature below the decomposition temperature. This results in an unblown portion of the melt shown as 31. Upon extrusion, the extrudate 32 will have a cellular core 30 and a smooth unblown skin 31.

It is noted that the skin thickness is greatly exaggerated for illustrative purposes. Actually, the skin thickness may be almost imperceptible, with the cellular core extending virtually to the surface. Of course, the thickness can be varied as desired as will be described below.

One example of the invention utilizes a Davis Standard Extruder with a 2½ inch diameter bore, and a bore length of 5 feet. The die lips have a 6 inch width and ⅛ inch opening. With this apparatus a rod-shaped heater element having a 1½ inch diameter is located within the die in a cavity having a 3½ inch cross-section. The axis of the heater element is approximately at the geometric center of the cavity. A one inch diameter rod has been also used successfully in the same die.

In one test with the above die and extruder, a blowing agent that decomposed at a temperature of between 360° and 380° F. was used. The measured temperature of the heater rod during the process was 400° F. and the die body was 330° F. The worm screw of the extruder revolved at 30 r.p.m. for this test. The result was a cellular core thermoplastic with a smooth skin.

As the plastic melt exits the extrusion die it will consist of two contiguous portions of plastic melt. The first or central portion will be cellular due to the decomposition of the blowing agent and the resulting diffusion of gas. The second or outer portion of plastic melt will remain to a great degree in a non-cellular or unblown state and envelop the first portion.

The effect then is to have a plastic article extruded from the extrusion die having a cellular core and a smooth unblown outer portion or skin. By proper adjustment of the apparatus the cellular core may extend virtually to the surface giving a very thin smooth skin if desired.

The thickness of the outer smooth, i.e., substantially unblown surface can be adjusted by control of the velocity of the plastic melt passing through the apparatus. This velocity is controlled conventionally by means of the worm gear in the duct of the extruder. The faster the worm gear revolves, the higher the velocity of the plastic melt. The slower the plastic melt passes through the extrusion die the longer it will remain in proximity to the heater element and the more extensively will the blowing agent decompose throughout the plastic melt. If for example the melt were moving slowly enough, virtually all the melt would be blown.

Control over the extrudate may be maintained by a number of adjustments to the apparatus. For example, the space between the heater element and the exit orifice can be adjusted. Such an adjustment can control the temperature relationships between the die body near the exit orifice and the heater element. The greater the distance the easier to maintain a temperature differential. Another factor helping to maintain such a differential is the natural heat insulating qualities of the melt that has been blown by its proximity to the heater element. This insulating quality prevents excessive heat transfer to the cooler unblown melt in the vicinity of the die body and exit orifice.

It may be desired to have the skin on one side of the extrudate thicker than the skin on the other side. This can be accomplished by placing the heater element closer to one half of the exit orifice than the other, or by separately varying the temperature of each section of the exit orifice by means of heating elements.

Upon exit from the die, the extrudate can be handled by conventional equipment.

Examples of suitable blowing agents

Chemical name:                 Decomposition temp., ° F.
  (1) Benzene sulfonyl hydrazide _____ 300–320
  (2) Azodicarbonamide _____ 330–425
  (3) p-Toluene sulfonyl semicarbazide ____ 435–500

It is apparent that other well-known commercial blowing agents than those mentioned above may be used provided they have a decomposition temperature high enough to remain undecomposed in a plastic melt processable by extrusion. The exact decomposition temperature range of the above blowing agents will depend on the specific thermoplastic material used with each agent. Two such thermoplastic materials which we have used successfully are acrylonitrile-butadiene-styrene polymers (commonly referred to as "ABS" resins) and polyvinyl chloride. The invention is not limited to the use of particular thermoplastic materials and virtually all of the well-known thermoplastic materials can be used for purposes of this invention. Different thermoplastic materials may be mixed in varying proportions according to the physical properties desired.

In practicing our invention we almost invariably use so-called chemical blowing agents, that is, chemical compounds which can be dispersed uniformly throughout the thermoplastic material and which decompose chemically, upon being heated to a sufficiently elevated temperature, to liberate a gas which gives the thermoplastic material its cellular form. Normally the cells formed by generation of the gas are "closed," i.e., non-intercommunicating, or substantially so.

While we have shown a transverse heating element which is cylindrical in cross-section we could use one having any other suitable cross-section, for example, one having a streamlined cross-section.

In practicing our invention we often make a sheet as a product, accomplishing this in the manner portrayed in the drawings by propelling the plastic melt leaving the adapter member 2 with the cross-section of opening 25 and causing it to gradually assume a sheet-like form of ever-increasing width relative to its depth as it moves forward in duct 24 so that by the time it makes contact with transverse heater element 10 it is manifested as a sheet as wide as the extruded sheet 32. The plastic melt then splits, enveloping heater 10, and thereafter is merged as shown in FIG. 4 to again form a sheet-like mass having a considerably larger volume than before due to the expansion. This last mass is then extruded between lips 8 to give the final sheet product 32.

As will be apparent from the foregoing specification, the apparatus and method of the present invention are susceptible of being embodied with various alterations and modifications which may differ particularly from those that have been described in the preceding specification and description. For this reason, our disclosure is intended to be merely illustrative and is not to be construed or interpreted as being restrictive or otherwise limiting of the present invention, excepting as it is set forth and defined in the hereto appended claims.

We claim:

1. A die for the extrusion of thermoplastic melt containing a blowing agent, comprising:
   an outer body having a cavity therein,
   an opening in said cavity through which said melt may pass into said cavity from a location external to said die,
   an exit orifice in said cavity through which said melt may be extruded, said exit orifice being elongated transversely so as to form a flat sheet-like extrudate,
   first heating means comprising an elongated heater for heating a portion of said melt to a temperature sufficiently high to activate said blowing agent, and blow said portion of said melt, said heater being located in said cavity and directly in the path of said melt passing through said cavity and extending transversely across said exit orifice, and
   second heating means for heating another portion of said melt sufficiently high to maintain it as a melt but insufficiently high to activate the blowing agent contained in said latter portion.

2. The apparatus of claim 1 in which said elongated heater is in the form of a cylinder which is axially parallel to said exit orifice.

3. Apparatus for extruding a thermoplastic material containing a blowing agent to form a sheet extrudate having a blown inner core and integral unblown skin portions on each side of said core, comprising:
   a extrusion die having an outer body surrounding a cavity extending from one end to the other, the entrance end of said cavity being relatively narrow in a transverse direction and having a sheet-like cross-section of progressively greater width in the direction of movement of the thermoplastic melt through said cavity,
   said cavity having a portion of relatively great depth as the melt nears the exit of the die,
   first heating means fixedly disposed in the portion of said cavity of relatively great depth for heating an inner portion of said melt to a temperature sufficiently high to activate said blowing agent contained in said portion, said heating means extending substantially from one side of said body to the other side thereof and serving to cause said inner portion of melt to be split and heated to activate said blowing agent as said inner portion of melt passes around it, the portions of the melt re-uniting to form an integral mass prior to passage through said exit orifice, and
   second heating means carried by said body for heating the outer portions of said thermoplastic material to a temperature sufficiently high to maintain it as a melt but insufficiently high to activate said blowing agent.

4. Apparatus for forming a plastic extrudate having an unblown solid portion and a blown cellular portion integral therewith, comprising:
   a die body having a passageway therethrough for conducting a plastic melt containing a blowing agent from an inlet opening in said die body through the die body and as said extrudate out an exit orifice in said die body,
   means for forcing said plastic melt containing a blowing agent into said inlet opening, thence through said passageway and out said exit orifice in the form of said extrudate,
   first heating means for heating one portion of said die body to a temperature so low that the portion of said plastic melt flowing through said passageway which is adjacent to the said portion of said body is maintained as a melt but below a temperature at which said blowing agent would be activated, and
   second heating means for heating another portion of said plastic melt flowing through said passageway to a temperature sufficiently high to activate said blowing agent and effect blowing of said last-named portion.

5. Apparatus as defined in claim 4 wherein said passageway is so designed that the plastic melt passing therethrough has a rectangular cross-section in planes at right angles to the direction of flow and in its portion adjacent said exit orifice is enlarged in planes at right angles to the direction of flow, and wherein said second heating means comprises a heater element having a rounded cross-section fixedly disposed transversely and centrally across the enlarged portion of said passageway with the axis of said heater element parallel to the rectangular configurations of the plastic melt stream in such a way that the plastic melt stream is split by said heater element into two streams which pass therearound and then merger integrally with one another before being extruded out of said exit orifice.

6. Apparatus for extruding a thermoplastic material having a blowing agent uniformly dispersed therethrough to form a sheet extrudate having a blown inner core and integral unblown skin portions on each side of said core, comprising:
   means for feeding an unblown melt of said thermoplastic material incorporating said blowing agent,
   an extrusion die comprising a die body having:
      a centrally located inlet opening on one side thereof into which said feeding means feeds said melt,
      an elongated rectangular exit orifice on the side of said die opposite said inlet opening,
      a passageway through said die connecting said inlet opening and said exit orifice for conveying said melt from said inlet opening to said exit orifice,
      said passageway comprising:
         a relatively shallow portion of rectangular cross section in planes at right angles to the direction of flow or said melt, said shallow portion increasing in transverse dimension from said inlet opening to a point in the proximity of the center of said die,
         a greatly enlarged portion extending from said point to a point adjacent said exit orifice and disposed so as to be generally coplanar with said shallow portion at its outermost end, and then diminishing in depth to form said exit orifice,
      an elongated solid member extending lengthwise of said greatly enlarged portion and being arranged generally concentrically to the walls thereof, thereby constituting means causing said plastic melt as it enters said last-named portion to split into two streams which pass around said member and flow together again after they traverse same,
      means for heating said member to an elevated temperature sufficiently high to activate said blowing agent and cause blowing of the plastic melt adjacent said solid member as it passes therearound, and
      means for maintaining the temperature of the body of said die and the lips of said exit orifice at a point sufficiently high to keep the plastic melt adjacent said body and lips in a melt condition but below the point at which activation of said blowing agent and blowing of said adjacent plastic melt would occur.

References Cited

UNITED STATES PATENTS 2,972,359  2/1961  Joukainen et al.
3,110,932  11/1963  Fischer _____ 18—30
3,443,007  5/1969  Hardy _____ 18—5

H. A. KILBY Jr., Primary Examiner

U.S. Cl. X.R.

18—5P, 12DS